United States Patent [19]

Hosaka

[11] 4,359,494

[45] Nov. 16, 1982

[54] FLEXIBLE SHEET MATERIAL WITH RAISED DECORATIVE PATTERN

[75] Inventor: Kimio Hosaka, Narashino, Japan

[73] Assignee: Kabushiki Kaisha Marubishi Sogyo, Tokyo, Japan

[21] Appl. No.: 281,204

[22] Filed: Jul. 6, 1981

[30] Foreign Application Priority Data

Jul. 7, 1980 [JP] Japan .......................... 55/95283[U]

[51] Int. Cl.[3] .......................... B32B 3/10; B32B 3/02

[52] U.S. Cl. .......................................... 428/15; 428/32; 428/133; 428/136; 428/224; 428/225; 428/904

[58] Field of Search .................... 428/7, 15, 131, 136, 428/155, 133, 253, 257, 111, 226, 904, 32, 114, 105, 224, 225; 156/148; 66/170; 112/430

[56] References Cited

U.S. PATENT DOCUMENTS 461,136 10/1891 Staples .............................. 428/257

*Primary Examiner*—Paul J. Thibodeau

*Attorney, Agent, or Firm*—Wenderoth, Lind & Ponack

[57] ABSTRACT

A raised decorative pattern is formed on a fabric by cutting spaced-apart slits side-by-side in a row in the fabric thereby to form in sequence first, second, third, and further strips as required of the fabric between adjacent slits and successively knitting the strips by a process resembling crocheting which comprises passing the second strip as a partial loop under and around the first strip, passing the third strip as a partial loop under and around the partial loop of the second strip, and thus successively repeating the procedure with the successive strips. A fabric with such a pattern can find use in a broad range of articles.

13 Claims, 7 Drawing Figures

FLEXIBLE SHEET MATERIAL WITH RAISED DECORATIVE PATTERN

BACKGROUND OF THE INVENTION

This invention relates to flexible sheet materials, such as fabrics, soft leathers, and cloth-like papers, on which patterns have been formed in a raised or outwardly projective manner.

When a piece of a fabric, soft leather, cloth-like paper, or the like (hereinafter referred to as "sheet" or "sheet material") or an article made of such sheet material is to be provided on at least one surface thereof with a decorative pattern of relief or raised nature, it has heretofore been the general practice to resort to techniques such as sewing a separate decorative or ornamental sheet material on the base sheet or threading embroidery threads through the base sheet. In all of these common methods, however, additional decorative materials are necessary, and the work of applying them on the base sheet requires much labor.

SUMMARY OF THE INVENTION

In view of the above described difficulty of providing raised decorative patterns on sheet materials, this invention contemplates providing sheet materials and articles made of sheet materials on which decorative patterns have been formed by a simple knitting process without the use of extraneous materials.

According to this invention, briefly summarized, there is provided a sheet material or an article made of sheet material on which one or more raised decorative patterns have been formed by forming slits (through cuts) at specific space intervals in the sheet material thereby to form strips of the material between adjacent cuts and successively passing adjacent strips under and around adjacent strips by a knitting process resembling crocheting.

The detailed nature, utility, and further features of this invention will be more clearly apparent from the following detailed description when read in conjunction with the accompanying drawings, briefly described below.

DETAILED DESCRIPTION OF THE INVENTION

Figure 1:
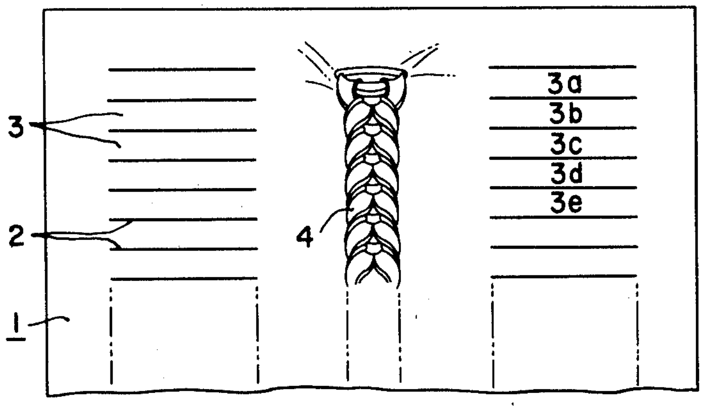
FIG. 1 is a plan view of an example of a sheet material according to this invention.

Referring first to FIG. 1, patterns as at 4 are to be formed on a surface of a sheet material 1. For this purpose, a required number of slits (through cuts) 2 are made at specific space intervals in the sheet material 1. In this illustrated example, the cuts 2 are all parallel straight lines of the same length spaced apart at equal intervals, their ends on each side lying on a straight line perpendicular to the cuts 2. As a consequence, a number of strips 3, 3, . . . all of the same shape with their ends integral with the sheet material 1 are formed.

Figure 2:
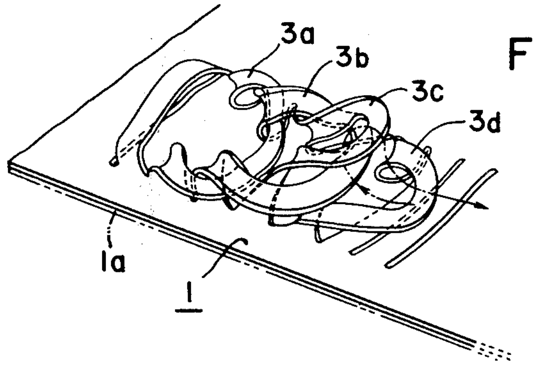
FIG. 2 is a relatively enlarged, fragmentary perspective view indicating the process of knitting a decorative pattern on a sheet material according to this invention.

These strips 3, 3, . . . are successively passed under and around their respectively adjacent strips in a knitting manner similar to crocheting to from the pattern 4 on one side of the sheet material 1. More specifically, in a row of strips 3*a*, 3*b*, . . . as shown on the righthand side of FIG. 1, for example, the strip 3*b* is passed down through the cut 2 between it and the strip 3*a*, under the strip 3*a*, and up through the cut 2 on the far side (upper side as viewed in FIG. 1) of the strip 3*a* thereby to form a partial loop of the strip 3*b* on the near surface (surface facing the viewer) of the sheet material 1. Next, the strip 3*c* is passed through this loop of the strip 3*b* to form another partial loop of the strip 3*c*. This process is successively repeated with the succeeding strips 3*d*, 3*e*, . . . as indicated in FIG. 2.

Variations in the shape and size of the formed pattern 4 can be made by suitably varying the spacing and lengths of the cuts 2. In the above described knitting process, the reverse side (far side) of each strip 3 is inverted and projected out from the sheet material 1 as the front surface. Accordingly, by attaching a separate cloth 1*a* (FIG. 2) on the reverse side of the sheet material 1 in the region of the cuts 2 or using a sheet material 1 having a reverse surface of a color differing from that of the front surface, a pattern of further decorative effect can be formed.

Furthermore, while the cuts 2 in the sheet material 1 in the above described example are straight-line cuts, the cuts may be of other suitable shapes such as arcs or Vee shapes. In such cases, the strips formed alternately between the cuts will form patterns differing from that due to straight-line cuts.

Figure 3:
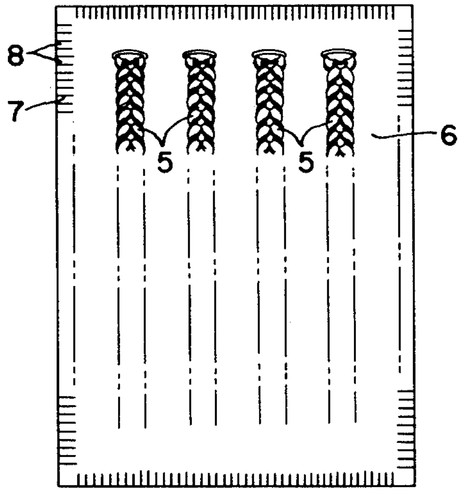
FIG. 3 is a plan view of sheet material of this invention for fabricating a hand bag, the sheet material being shown in an unfolded state.
Figure 4:
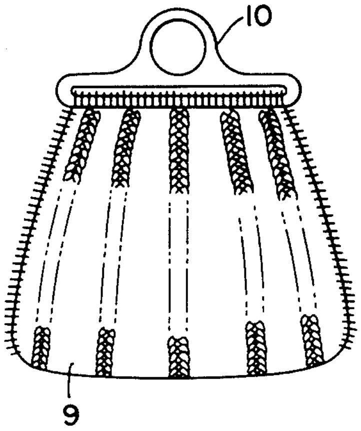
FIG. 4 is a view of a finished hand bag made of a sheet material such as that shown in FIG. 3.

Examples of practice embodying this invention are illustrated in FIGS. 3 through 7. In FIG. 3 is shown an oblong sheet material 6 on which patterns 5, 5, . . . have been formed according to this invention. Cuts 7, 7, . . . are formed at equal spacing intervals along both side edges and upper and lower edges of this sheet material 6 thereby to form strips 8, 8, . . . having free outer ends and inner ends integral with the material 6. The sheet material 6 is then folded along its horizontal axis, and the confronting strips 8, 8, . . . along the side edges are mutually tied together thereby for forming a bag-like structure 9, as shown in FIG. 4. The strips on each side of the opening of this bag-like structure 9 are tied to respective handles 10 (only one of which is shown in FIG. 4), whereupon a hand bag is produced.

Figure 5:
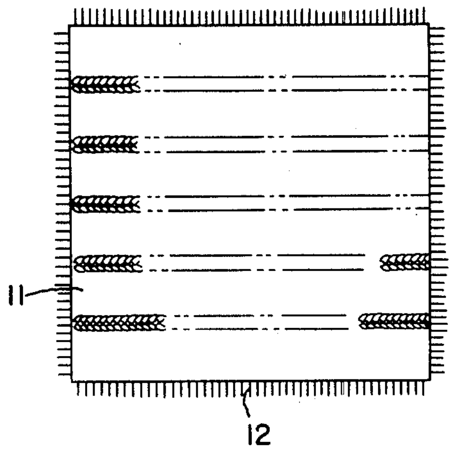
FIG. 5 is a plan view of a table mat made of a sheet material of the invention.

A table place mat or center mat as shown in FIG. 5 can be made by cutting a sheet material 6 as described above with patterns formed thereon according to this invention along the peripheral edges thereof at small intervals thereby to form a fringe 12 around the peripheral edge.

Figure 6:
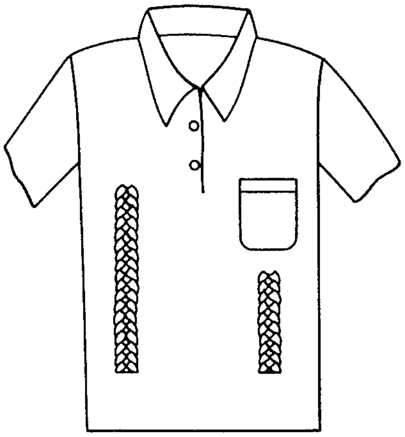
FIG. 6 is a front view of a shirt made of a sheet material of the invention.

Furthermore, decorative patterns can be formed on articles of clothing, one example of which is a shirt as shown in FIG. 6.

Figure 7:
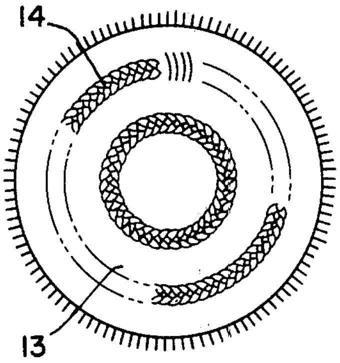
FIG. 7 is a plan view of a cushion cover made of a sheet material of the invention and having circular patterns.

A further example of application of this invention is a cushion cover as shown in FIG. 7. In this cushion cover, slits (through cuts) are made around common circles to form circular patterns 14.

According to this invention as described above, raised decorative patterns can be formed on sheet materials or articles made of sheet material without the use of separately provided decorative or ornamental sheet material, laces, threads, and needles. These decorative patterns according to the invention can be selectively varied over a wide variety of patterns, whereby the sheet material of this invention can be applied to a broad range of articles in addition to the hand bag, table mat, shirt, and cushion cover described above.

What is claimed is:

1. An article comprising a flexible sheet of material, having a raised local decorative pattern formed thereon, said decorative pattern including a plurality of substantially parallel through cuts in said material, each of said plurality of through cuts having two spaced apart ends both terminating within said material, said plurality of through cuts forming a plurality of local strips of said material between adjacent ones of said plurality of through cuts along a line extending perpendicularly to said through cuts, each of said plurality of strips being successively passed under and around adjacent ones of said plurality of strips in such a manner that said plurality of strips form a series of interlocking loops.

2. An article as in claim 1, wherein said material comprises an uncut portion surrounding the area of said sheet covered by said pattern.

3. An article as in claim 1 or claim 2, wherein said plurality of strips include in sequence first, second, third and further strips, said pattern being formed by said second strip passed as a partial loop under and around said first strip, said third strip passed as a partial loop under and around the partial loop of said second strip, and successive ones of said further strips being passed as partial loops under and around preceeding partial loops of said strips.

4. An article as in claim 1 wherein said material comprises cloth.

5. An article as in claim 1 wherein said material comprises unwoven fabric.

6. An article as in claim 1 wherein said material comprises felt.

7. An article as in claim 1 wherein said material comprises soft leather.

8. An article as in claim 1 wherein said material comprises artificial leather.

9. An article as in claim 1 wherein said material comprises cloth-like paper.

10. An article as in claim 1 wherein said through cuts are Vee-shaped.

11. An article as in claim 1 wherein said through cuts are curved.

12. An article as in claim 1 or 2 wherein the edges of said sheet are fastened to each other to form a finished article.

13. An article as in claim 2 wherein said uncut portion is unwoven and that portion of the material within each of said several strips is unwoven.

* * * * *